United States Patent [19]

Taylor

[11] Patent Number: 4,637,055

[45] Date of Patent: Jan. 13, 1987

[54] ADAPTIVE PATTERN RECOGNITION

[75] Inventor: Peter J. Taylor, Cambridge, England

[73] Assignee: PA Consulting Services Limited, London, England

[21] Appl. No.: 614,149

[22] Filed: May 25, 1984

[30] Foreign Application Priority Data

May 27, 1983 [GB] United Kingdom ............... 8314778

[51] Int. Cl.$^4$ .............................................. G06K 9/00
[52] U.S. Cl. .......................................... 382/31; 382/6
[58] Field of Search ....................... 382/31, 33, 34, 43, 382/56, 18, 6

[56] References Cited

U.S. PATENT DOCUMENTS 4,139,303  2/1979  Carlson et al. ..................... 382/31
4,150,360  4/1979  Kopp et al. ........................ 382/31

OTHER PUBLICATIONS

B. J. Thompson, "Hybrid Processing Systems—An Assessment", *Proceedings of the IEEE,* vol. 65, No. 1, pp. 62–76, Jan. 1977.

B. Braunecker et al., "Hybrid Image Processing", *Photo. Science and Engineering,* vol. 21, No. 5, pp. 278–281, Sep./Oct. 1977.

*Primary Examiner*—Stephen A. Kreitman
*Attorney, Agent, or Firm*—Oblon, Fisher, Spivak, McClelland & Maier

[57] ABSTRACT

A pattern recognition system which produces from any object a diffraction pattern-typically an optical Fourier transform of the object, on a high resolution detector. Different points in the detector can be addressed by a scanning device to produce an electrical signal which can be digitized if required before being processed and compared with reference signals in a processor. A reduction in the formation to be scanned and pattern matched is obtained by using an optical Fourier transform or the like of the original object. A further reduction in the information needed to classify each of a known group of objects is obtained by a method which involves the presentation of each of the group members to the apparatus, the computation from each scanning of a discriminant function by multivariate analysis of the signal produced by the scanning and the use of the discriminant function to determine the points in the scanning of subsequent unknown members of the group which are required (and the weighting to be attributed to the signal at each such point) to allow for the reliable classification of each such unknown member of the group.

20 Claims, 9 Drawing Figures

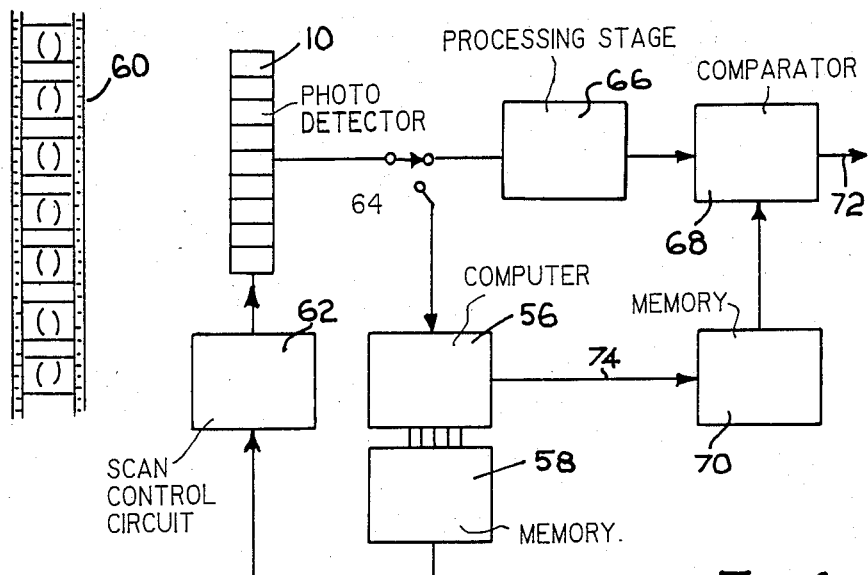
Fig. 4
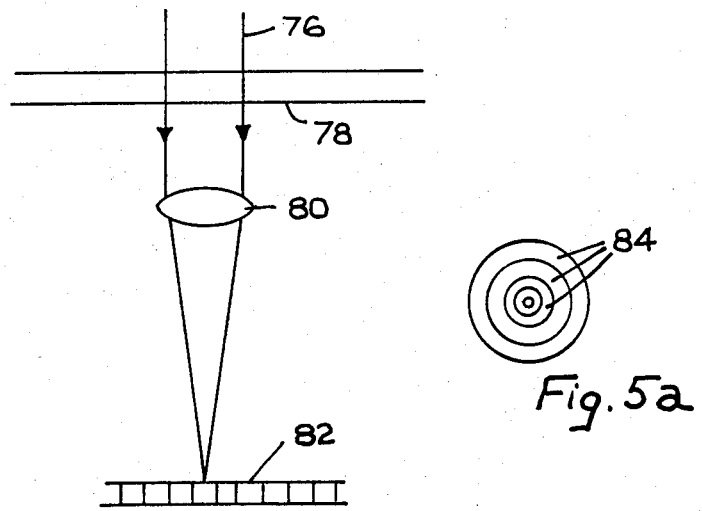
Fig. 5
Fig. 5a

ADAPTIVE PATTERN RECOGNITION

FIELD OF INVENTION

This invention concerns automated inspection and particularly optical inspection systems adapted to recognise selected obejcts from groups of objects and systems which can be adapted to learn what characteristics to look for from a training set of such objects so as thereafter to be able to recognise such objects readily and quickly.

Background to the Invention

High speed image processing or pattern recognition of components and the like is and will become even more necessary to cope with high throughput rates likely to be encountered on production lines and the like. To date this is achieved through the use of a conventional video camera or solid-state photodetector array coupled to a very powerful high speed computer processor.

Often in microscopy it is necessary to search for objects of interest on slide preparations such as for example to count the number of deformed cells amomgst the population of normal cells.

In robotics the object is usually more clearly defined and comprises the task of selecting quickly and accurately each of a number of differently shaped component parts from a group of component parts which may be presented to the robot either in a static array or on a conveyor belt.

In quality control it is also necessary to be able to watch for irregularities and imperfections in finished products and automated inspection of the output of assembly lines and the like will become more commonplace.

In all such applications it is necessary for the inspection apparatus to be able to recognise both quickly and reliably from the shape of the objects presented to it, those which are of interest, and to generate a signal indicating the presence of such an object within its field of view. It is also desirable that such systems shall be capable of being taught to determine what characteristics of shape should be looked for in order to select each of a number of different articles from a set of articles. Thus in addition to providing a high speed recognition apparatus it is another object of the present invention to provide an apparatus which is capable of learning from a set of articles presented to it, what features are required to be looked for subsequently in order to be able to distinguish one object from another within the group.

It is an overriding object of the present invention to reduce the amount of information which has to be utilized by the system to determine the characteristics of objects presented thereto so as to speed up the process of identification.

Hitherto a typical pattern recognition system has comprised a television camera or similar scanning device linked to video signal processing circuits and a computer adapted to produce from the scanning a digitised signal for processing by the computer to permit a number of different measurements to be made on the feature content found in the image of the field of view. Such processing and computation techniques are well known and a number of image analysing computers are commercially available capable of making numerous different measurements of area, perimeter, diameter etc on objects in a field of view. In this way cells on microscope slides have been counted and classified according to shape.

Such systems however are inherently slow by comparison with the human eye basically in view of the large amount of information which has to be processed before the measurements can be made on any given field. Even with the use of parallel processors and full-field image stores, a considerable length of time may be needed between the presentation of an object to the system before a decision can be made by the system as to what is present in the field of view.

Where the object of the inspection process is merely to look for one particular type of feature which perhaps may only be present to the extent of 1 in 1000 or 10,000 objects presented to the inspection system or where the object of the inspection is to identify selectively different ones of a group of known objects to determine the position of each such object and thereby for example assist a robotic device to locate and pick up the objects, for example to facilitate in the assembly of a mass-produced product, the recognition process can be considerably speeded up if instead of using electronic processing, optical processing is employed instead. Thus it is possible to make an optical filter which can be compared with optical images of objects presented to a viewing system and for example by forming a transparency of the desired object and focussing light from each of the series of objects to be inspected by a system through the transparency, and by measuring the amount of light transmitted through the transparency, so an indication of correlation of the shape of the object in the field of view can be made relative to the shape of the object in the transparency. If the object in the field of view is the same as that pictured in the transparency then a given amount of light will be transmitted by the transparency and for other shapes which do not completely fit the object shape in the transparency, different light levels will be transmitted. By looking for a given range of light level transmissions so an object can be identified in relation to its correlation with the transparency.

Whilst optical matching methods such as described can indicate instantaneously whether or not there is identity between the image of an object and a transparency containing a picture of the same object there is a considerable amount of time needed to set up the system to ensure that the object is presented correctly orientated and in correct focus and scale before any comparison can be effected. Consequently such optical matching methods tend to be relatively slow overall.

It is of course known that if a two-dimensional object is illuminated by coherent light a diffraction pattern can be obtained which is unique to the object and which is in turn dictated by the shape of the object. Although such diffraction patterns are orientation sensitive they are relatively insensitive to the position of an object within the field of view and one form of pattern recognition system based entirely on optical techniques involves the production photographically of a transparency derived from the diffraction pattern produced by a given object and to position this transparency at a suitable point in an optical system which is set to view a population of objects using coherent light so as to form a diffraction pattern for each of the different ones of the objects presented thereto. By rotating the transparency relative to an image of each diffraction pattern produced for each of the population of objects, so it is possible to check for identity between the transparency diffraction pattern and that arising from each of the series of objects.

Although the optical pattern matching is considerably faster than if ordinary optical pictorial transparencies are compared with full images of the field of view containing the test objects, the process has very limited applications since a transparency has to be prepared for each object which is to be presented to the system and if each object of a series of objects has to be identified uniquely, then each diffraction pattern obtained from each of the objects has to be compared with each one of the transparencies contained within the system, in turn, and each transparency rotated in order to determine the identity of each object so inspected.

It is an object of the present invention to combine the advantages of optical pattern recognition with the high speed and power of digital computing pattern recognition systems so as to obtain a recognition system which is capable of operating at very high speed and which is also capable of being adapted to recognise different objects from a population of objects by simply showing the population of the objects to the system in turn during a learning mode.

SUMMARY OF THE INVENTION

According to one aspect of the invention an optical inspection system for analysing the object content of a field of view comprises i. an optical system adapted to produce either from the said object content or an image thereof, a diffraction pattern;

ii. light level detection means on which the diffraction pattern is focussed for producing electrical signals corresponding to light intensity at different points within the pattern;

iii. electrical circuit means responsive to said electrical signals for comparing selected signals with a reference pattern.

In its simplest form therefore the invention combines the high speed of an optical regonition system using a diffraction pattern derived from each of the objects to be classified with the high speed of operation of an electronic detection device for checking the content of the diffraction pattern and looking for correlation with electrical signals indicative of reference diffraction patterns previously stored in an electronic memory associated with the inspection system.

It should be noted that the image of the object content which is to be transformed into a diffraction pattern may be formed entirely optically or electronically or by any combination of optical and electronic techniques and may be assembled from the output of a lens system as in a camera, or from the output signal from a scanner such as a television camera or flying spot scanner or from an electron microscope or the like. It is merely necessary that the image so formed shall be capable of being illuminated by coherent light so as to form a diffraction pattern thereof and the illumination may be by way of transmitted light or reflected light.

Where two-dimensional objects are to be classified, it is simply necessary to illuminate each object using a coherent light source so as to form a diffraction pattern corresponding to each object in turn and to electronically scan each diffraction pattern so produced and pattern match the electrical signals derived from the scanning with stored signals to classify each diffraction pattern.

Where the objects are not sufficiently two-dimensional for diffraction patterns relating solely to shape or surface characteristics of the objects to be produced, the latter may be imaged using conventional optics onto a device for forming a two-dimensional reproduction of the optical image of the object and a coherent light source is provided to illuminate the two-dimensional representation to produce a diffraction pattern from the content of the optical image.

The first arrangement is thus eminently suited to the direct study of for example, microscope slides which can normally be considered to represent two-dimensional objects whilst the latter approach involving the use of additional optics is better suited to the inspection of three-dimensional objects such as components on a conveyor belt or the like.

One device for forming a two-dimensional reproduction of an optical image comprises a Hughes liquid crystal light valve. Such devices rely on the local electric field in a wafer of semi-conductor to control the local reflectivity of an adjoining liquid crystal with an optical barrier between the two to prevent light incident on the semi-conductor wafer from impinging on the liquid crystal display and vice-versa. By focussing an image of the field of view onto the semi-conductor wafer so a two-dimensional reproduction of the image is formed in the liquid crystal display associated therewith and by using the latter to reflect coherent light so a diffraction pattern can be obtained.

It is to be understood that the invention is not limited to the use of a Hughes liquid crystal light valve but any device capable of producing a two-dimensional reproduction of an optical which can then interact with a coherent light beam to produce a diffraction pattern, may be employed.

The reference pattern may comprise a set of electrical signals stored in a form which can be addressed for subsequent comparison with patterns of electrical signals derived by a scanning of the detection means on which the diffraction pattern is focussed. Typically the reference patterns are obtained by presenting specimen objects to the inspection system and storing a pattern of electrical signals obtained by scanning selected points within the detector. These signals may themselves be processed by computing means to produce a mathematical algorithm which can then be used to classify subsequent signal patterns corresponding to diffraction patterns of subsequently scanned fields of view.

The diffraction pattern typically comprises a Fourier transform of the object content of the field of view. Where this is the case, relative rotation either actual or effective must be introduced between each reference signal pattern and patterns of electrical signals obtained from scanning the light level detection means. This arises from the fact that a Fourier transform is sensitive to the orientation of the object producing the transform relative to the optical axis of the viewing system.

Where the light level detection means comprises a photosenstive detector having different regions or elements which can be addressed separately to allow a scanning to be performed over the area on which the diffraction a pattern is formed, relative rotation is simply effected by altering the control signals employed to effect the said scanning.

Typically an inspection system as aforesaid will include memory means for storing a plurality of different signal patterns as electrical information signals and means will be provided for comparing the electrical signal patterns arising from a scanning of the detection means with the electrical signals obtained by addressing the stored reference signal patterns to facilitate the identification of each signal pattern arising from a scanning of a detector when presented with an unknown diffraction pattern.

An optical system as aforesaid may be rendered adaptive thereby to enable the system to recognise different ones of a group of objects by providing computing means programmed to perform multivariate analysis of signal patterns supplied thereto and by providing means for supplying electrical signals from the detector to the input of the computing means during a learning mode so that a discriminant function can be obtained for the set of objects (forming a training set) as the latter are presented in turn to the system during the said learning mode. Using the discriminant function during subsequent scans so the diffraction patterns arising from other objects in the group can be identified and classified typically using a look-up table.

Typically the computing means is programmed so as to perform a least mean square analysis of the electrical signals derived from each of the diffraction patterns from the training set of objects.

Further means may be provided responsive to the discriminant function to identify selected points within the area of the said detection means so as to effect a reduction in the number of points within the said area which must be inspected during subsequent scans for classifying diffraction patterns arising during said subsequent scans thereby to speed up the said classification procedure.

In addition to determining the selected points within the area of the said detection means from which information is to be derived during subsequent scans, the discriminant function additionally provides an algorithm to dictate the weighting to be attributed to the electrical signals obtained from each said selected point. Accordingly the system as aforementioned preferably further comprises signal processing means responsive to the said discriminant function to process the electrical signals produced during the scanning of the light level detector means to solve the discriminant function algorithm for each diffraction pattern and means is provided for comparing the value of each such solution of the said algorithm with a look-up table to determine the category or identity of each said diffraction pattern and thereby the category or identity of the object producing same.

Thus in accordance with another feature of the invention, an optical inspection system as aforesaid comprises a memory associated with computing means by which reference information obtained using the discriminant function is stored for different objects in the training set in the form of a look-up table so that subsequently computed values for the discriminant function, using different objects, can be compared with the reference information stored in the memory and each subsequent object identified according to the identity stored in the look-up table.

According to another aspect of the invention a method of identifying the object content of a field of view comprises the steps of:

i. producing a diffraction pattern of the said object content, ii. imaging the diffraction pattern onto a detector adapted to generate a first electrical signal, one parameter of which varies in dependance on the light level at different points in the diffraction pattern image; and iii. comparing the said first electrical signal with one or more stored signals, the output of the comparison determining the identity of the said object content. In the method as aforesaid, a second electrical signal may be derived from the first electrical signal and the identity comparison may be effected between the second electrical signal and the said stored signal or signals. Thus the electrical signals derived from a scanning of the diffraction pattern as seen by the detector may be processed according to some algorithm and a value computed for each diffraction pattern seen by the detector, for comparison with signals stored from previous computations (using the same algorithm) on signals arising from the scanning of diffraction patterns obtained using a training set of objects.

The amount of information to be processed by the algorithm and the amount of information to be stored for subsequent comparison can be significantly reduced by carefully selecting a relatively small number of points within the area on which the diffraction patterns are focussed and only processing signals from the selected regions within the detector so as to generate a value to be attributed to the diffraction pattern concerned for identifying same. If random access scanning is employed, the time required to determine the signal content to be fed to the algorithm can be reduced dramatically and it will be seen that if a single numerical value expressed perhaps in binary digital form is to be computed and stored for each training article and a similar binary digital value obtained for comparison therewith from subsequent scans, the amount of storage needed and the time for comparison of one value with another can be very significantly reduced by comparison with other comparison techniques which involve point by point comparison of anaolgue or digitised video signals.

According to a preferred feature of the invention a method is provided for selecting those regions of a detector in an optical inspection system from which electrical signals are to be derived to facilitate the classification of objects subsequently imaged by the system, the system being one in which a diffraction pattern of the object content of each field of view to be inspected and classified is focussed on to the detector and in which an electrical signal is generated having a parameter which varies in dependence on the light level at different points in the diffraction pattern, the method comprising the steps of:

i. presenting to the inspection system one of a plurality of objects from a group ii. producing a diffraction pattern of the object content in the field of view as each object is presented to the system iii. imaging the diffraction pattern on to a detector having a plurality of different light sensitive regions and generating from a scanning of the said regions a first electrical signal for each diffraction pattern from each said object iv. applying the said first electrical signals to computing means programmed to produce from such electrical signals a discriminant function, the discriminant function determining the positions within the image area of the said detector of selected ones of a plurality of regions therein, from which the said first signal is to be generated during subsequent inspection scans, and v. limiting the electrical signals from the said detector means during inspection scans to electrical signals arising from the said selected regions of the detector to thereby reduce the amount of information which must be processed during the inspection scans for the subsequent identification of objects of the said group when presented to the inspection systems.

The said limitation may be effected by replacing the detector with one which is only sensitive at the positions of the said selected regions thereof.

Alternatively the limitation may be effected by masking the said detector with a mask having windows therein which correspond in position to the selected regions of the detector.

Where electrical control signals are generated to effect a scanning of the different regions of the detector, the limitation may be effected by adjusting the control signals so as to cause only the selected regions within the detector to be addressed during the scanning.

According to a further aspect of the invention in an optical inspection system comprising optical means for forming a diffraction pattern of the object content of the field of view of the inspection system, light level detection means on which the diffraction pattern is focussed for producing electrical signals corresponding to light intensity at different points within the diffraction pattern, electrical circuit means responsive to the said electrical signals for comparing selected signals with a reference pattern, the outcome of each such comparison determining the identity of the object content of the field of view, there is provided an improved method of operation for reducing the time to identify objects of a given class, comprising the steps of:

i. presenting to the system examples from the said group of objects so that each said object occupies the said field of view in turn, ii. forming a diffraction pattern of the object content of each said field of view and at least temporarily storing the first electrical signal obtained from the detector for each said field of view, iii. computing from the stored signals a discriminant function for the group and determining therefrom the positions of selected windows in the diffraction pattern image from which information must be derived to permit identification of the different objects within the group.

iv. storing the discriminant function or signals which will allow for identification or creation of said selected windows in the diffraction pattern image, and v. limiting the information presented to the said electrical circuit means during subsequent inspections to the electrical signals derived from the said selected windows in the diffraction pattern.

The invention thus provides an optical inspection system which reduces the optical content of the image on which pattern recognition is to be performed by utilising diffraction patterns of the objects which are to be identified and further reduces the information to be handled by this system when classifying different objects within a group of known objects, by determining only those points within each diffraction pattern which must be checked to permit each such pattern to be identified uniquely from the other patterns in the group to thereby reduce the amount of signal processing and computation which must be performed during each such identification and classification step.

Additionally the invention provides an adaptive pattern recognition system for use with a group of objects by providing at least during the learning process a computing means adapted to perform multivariate analysis of signal patterns supplied thereto to derive for the group of objects a discriminant function for the group which not only determines the algorithm which must be solved to produce different unique numerical values for each of the different objects within a group of objects but also will dictate which of the points within the scanned area must be investigated during each exploratory scan from which electrical signals must be derived for processing within the algorithm to produce a numerical value attributable to each diffraction pattern so analysed.

The invention will now be described by way of example with reference to the accompanying drawings in which FIG. 1 is a block schematic diagram illustrating one embodiment of the invention, FIG. 2 is a similar block schematic diagram of another embodiment of the invention, FIG. 3 is a further block schematic diagram of a third embodiment of the invention, FIG. 4 is a block schematic diagram illustrating a still further embodiment of the invention, FIG. 5 is a diagram illustrating the application of the invention to object recognition in microscopy and FIG. 5a is a diagram of a photodetector of this invention with concentric rings.

Figure 1:
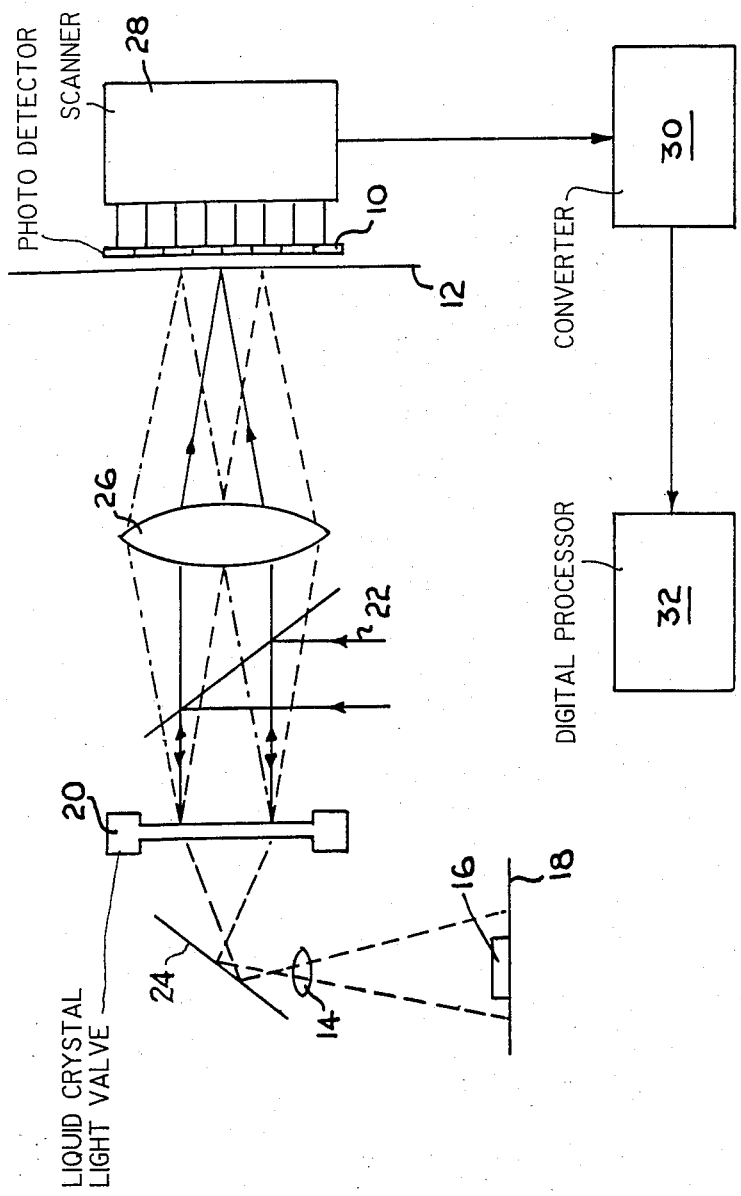

In FIG. 1 a standard multi-element two-dimensional photodetector 10 typically a General Electric CID (charge injection device) scanner, is located in the Fourier transform plane 12 of an optical inspection system. The latter comprises a lens 14 for forming a real and in focus image of an object 16 supported by a neutral background 18 on a Hughes liquid crystal light valve 20. Parallel coherent light 22 also falls on the light valve 20 and the two optical systems of the light from the valve 20 and the parallel coherent light are separated by a half reflecting mirror 24.

The two-dimensional reproduction of the image of the object 16 is produced by the light valve 20 which is itself illuminated by the parallel light 22 and produces a diffraction pattern constituting a Fourier transform which is focussed by a Fourier transform lens 26 onto detector 10.

The latter is addressed by a scanner 28 and this photodetector samples the spatial frequency spectrum of the object 16 at a large number of points, thus translating the optical spectrum into an electrical signal.

Where appropriate analogue to digital conversion is provided for by way of a converter 30 to provide digital signals relating to the frequency spectrum seen by the detector for supply to a digital processor 32. The latter is typically a digital computer having stored therein a reference spectrum with which the incoming digital signals may be correlated rapidly.

Figure 2:
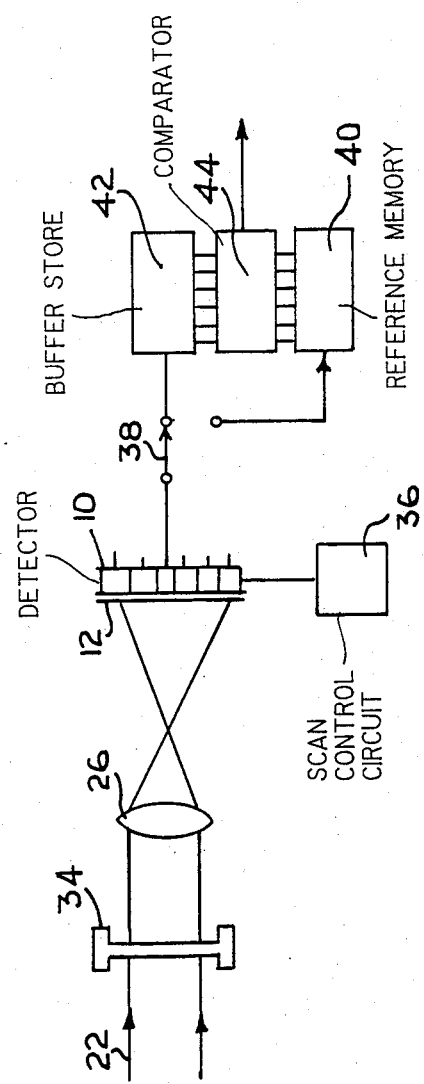

In FIG. 2 the light valve 20 is replaced by a transparent object 34 which is illuminated by the parallel coherent light 22 so as to form as before a Fourier transform diffraction pattern which is brought to focus by lens 26 on the detector 10 The latter may comprise a Vidicon television camera or a General Electric CID device as referred to with regard to FIG. 1. Scanning of the different photosensitive regions of the device may be effected on a random access basis or on a raster scanning basis or circularly or in a spiral manner.

Scanning is controlled by a scan control circuit 36 and as shown diagramatically by switch 38, the output of the detector during any single frame scan may be supplied either to a reference memory 40 of a buffer store 42.

During a preliminary learning scan, a known object is located at 34 and switch 38 is set to supply the scan output signal to reference store 40. The object 34 is then replaced by other objects which are to be checked against the first and the switch 38 is changed to supply the output from the scanning of each of the test objects in turn to the buffer store 42. At the end of each scanning, the contents of the buffer 42 and the reference store 40 are compared by a comparator 44 the output of which indicates a measure of the correlation of the two signals stored in 40 and 42.

Depending on the degree of correlation so the subsequent objects can be identified as the same as or different from the original specimen object.

Figure 3:
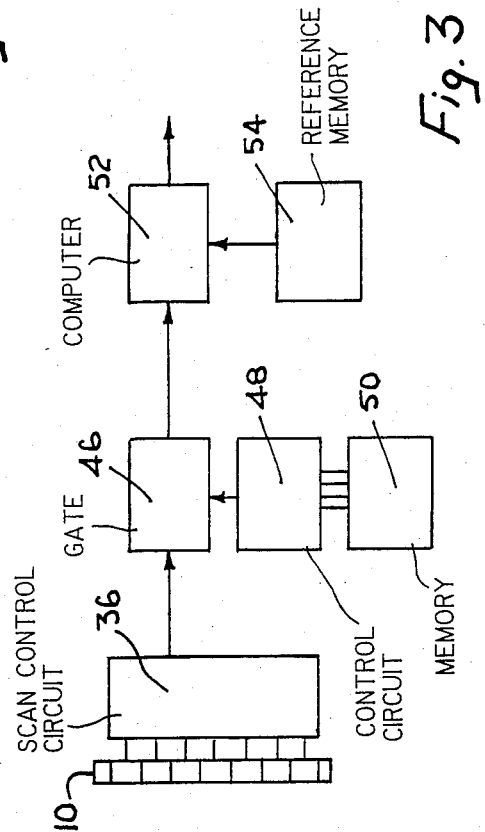

In FIG. 3 a Fourier transform diffraction pattern is formed by either of the arrangements shown in FIGS. 1 and 2 on a detector 10 having a scanner associated therewith for addressing the different points within the scanner.

A gate 46 in the output of the scanner is opened and closed by means of a control circuit 48 attached to a memory 50 containing information relating to selected positions in the scanned area of the detector. The control circuit 48 uses this information to control the opening and closing of the gate 46 so as to limit the information passing to a computer 52, to that arising from the selected regions of the scanned area of the detector 10 using the information contained in the memory 50.

The computer 52 compares the information arising during a scanning of the area with the information stored in the reference memory 54 to produce an output signal the value of which indicates whether or not there is correlation between the information arising during the scan and the reference memory content.

Although not shown the gate 46 may include signal processing means (not shown) for modifying the amplitude or phase or frequency or some other parameter of the electrical signals released by the gate 46 according to some pre-arranged algorithm.

It will be seen that in each of these embodiments there is a reduction in the amount of information needed to effect a comparison between one object and another thereby allowing a considerable increase in the speed of classifiction.

The self learning or adaptive capability of the invention is demonstrated in its simples form in FIG. 2 and is further demonstrated in the embodiment illustrated in FIG. 4.

In this arrangement the inspection system is arranged to ascertain from each of a group of objects, the salient shape characteristics from the Fourier transform diffraction pattern obtained for each of the objects, by which each object can be distinguished from other members of the group and an algorithm of discriminant function as it is more commonly called is computed from the preliminary measurements made by the detector on the different Fourier transforms presented to it by the training set of objects.

The output from the detector 10 can be supplied to a computer 56 which may for example be programmed to perform multivariate analysis of signal patterns supplied thereto, typically by means of at least mean square analysis, so a to determine a diacriminant function (typically a linear discriminant function) for the group of objects which function is stored in a memory 58 associated with the computer.

The objects may for example be a series of photographic transparencies of microscope slides shown at 60 and the Fourier transform diffraction pattern is obtained by illuminating each transparency in turn by parallel coherent light.

After computing and storing the discriminant function in memory 58 the computer no longer serves any useful purpose other than as perhaps a centralised control for the system, if required, and during subsequent scans, during which known transparencies are converted into diffraction patterns on the detector 10, the scanning of the latter is controlled by means of a scan control system 62 itself programmed in accordance with the discriminant function stored in the memory 58 and the output from the detector 10 is supplied via the alternative position of switch 64 to a signal processing circuit 66 for producing value from information arising during the scanning of each fresh diffraction pattern, with the weighting of each individual component arising during the scanning being determined by the discriminant function which has the typical form $$A = B \cdot m + C \cdot n + D \cdot p + E \cdot q + F \cdot r \ldots$$

where
- A is the value to be computed and
- B, C, D, E and F are whole numbers or fractions determining the weighting of the invidual components and
- m· n· p, q, r etc constitute the electrical signals at selected points arising during the scanning of the detector 10.

The output from the processing stage 66 is supplied to a comparator 68 associated with a second memory 70 arranged as a look-up table and the output signals at 72 comprise the values in the look-up table corresponding to the computed values of the discriminant function as produced by processing stage 66.

Providing that the computer 56 provides the values for the look-up table memory 70 via signal path 74 during the initial learning phase, it will be seen that the system shown in FIG. 4 is completely self adaptive to recognise each of the members of any group of objects and all members of the group can be supplied to the system as a training set.

Often in microscopy it is necessary to search for objects of interest on a slide preparation, for example to count the number of deformed cells amongst a population of normal cells.

FIG. 5 illustrates how this recognition process can be automated. A beam of coherent light 76 is projected through an area of a slide 78 and focused by lens 80 onto a photodetector array 82.

If, for example, normal cells are circular and deformed cells are elliptical, a detector array consisting of a plurality of concentric photosensitive rings 84 can be used as shown in FIG. 5a.

The detector 82 is situated in the Fourier plane of the lens 80 so that the output from each ring 84 corresponds to the content of the field of view over a range of spatial frequencies defined by the inner and outer radii of each ring. Varying the orientation of an object within the field of view does not affect the signals from the detector rings arising from scanning the detector 82.

In the case of a deformed cell in which one diameter reduces to become the minor axis of an ellipse, the reduced dimensions parallel to that axis will result in a higher spatial frequency content and will produce a relatively larger signal in the outer rings of the detector, whatever the orientation of the ellipse, than is the case for a circular cell.

For normal cells the signals from the various ring elements will fall within certain limits defined by the variations in acceptable cells. For deformed cells the signals will fall within other limits outside the first set of limits and can therefore be distinguished using a comparator and reference memory (not shown).

When the microscopic slide is scanned past the field of view, cells within the field of view can be classified by comparing the signals they produce within the defined limits.

When deformed cells are detected they can be counted, or held for further investigation, for example by eye.

Figure 6:
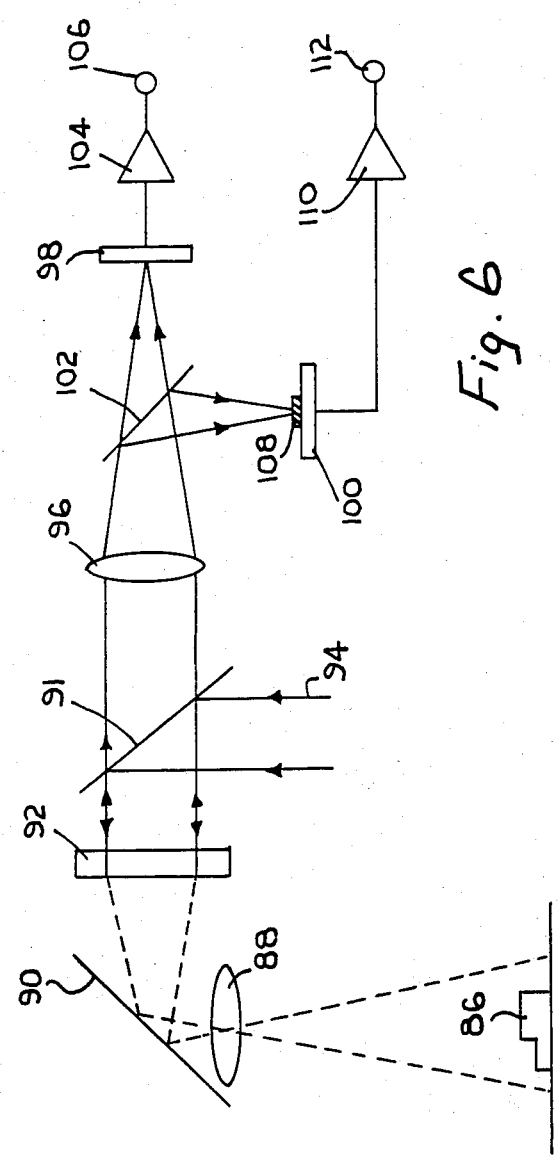
FIG. 6 illustrates how the invention may be applied to the field of robotics.

In FIG. 6 an object 86 is imaged by lens 88 via beamsplitter 90 onto a Hughes light valve 92 which produces a two-dimensional reproduction in the form of a transparency of the object 86.

Parallel coherent light 94 is projected via beamsplitter 91 onto the light valve 92 and a diffraction pattern of the two-dimensional reproduction in the light valve is focused by lens 96 onto a detector 98 and detector 100 via beamsplitter 102.

Figure 6B:
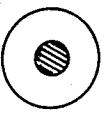
FIG. 6b is a top view of the detector 100.
Figure 6A:
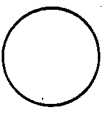
FIG. 6a is a top view of the detector 100.

Item 98 is a large area detector, shown in plan in FIG. 6a, which integrates all the light from the field of view containing the object 86. Item 104 amplifies the signal and gives an output at 106 corresponding to the area of the object in the field of view.

Detector 100 is obscured centrally by an opaque stop 108 as shown in FIG. 6b. As detector 100 is in the Fourier transform plane of the lens 96, the effect of the stop is to remove the light produced by low spatial frequencies in the field of view. The light falling onto the detector corresponds to the high spatial frequency content of the scene at the edges of the object 86. Item 110 is an amplifier which gives an output at 112 corresponding to the length of each of the edges in the object, ie its perimeter.

Different objects can be characterised by the values of their area and perimeter and the ratio between the square of the perimeter and the area. For each class of objects one can define upper and lower limits for each feature parameter such as area; perimeter; and perimeter squared over area. These limits would be derived from measurements on a training set of known objects.

When a new object enters the field of view, its features are calculated. If all three fall within the limits defined for one object type, the new object is recognised as being of that type.

I claim:

1. An optical inspection system for analyzing the object content of a field of view comprising:
    an optical system adapted to produce either from the said object content or an image thereof, a diffraction pattern;
    a light level detection means on which the diffraction pattern is focussed for producing electrical signals corresponding to the light intensity at different points within the pattern;
    electrical circuit means response to said electrical signals comprising means for storing a plurality of different reference signal patterns and comparison means for comparing the electrical signals from the light level detection means produced from a subsequent field of view with each of the stored reference signal patterns to facilitate the identification of the subsequent signal pattern.

2. An optical inspection system as set forth in claim 1 for use with 2-dimensional objects comprising a coherent light source for illuminating the objects directly and forming thereby the said diffraction patterns thereof.

3. An optical inspection system as set forth in claim 1 wherein the optical system comprises:
    i: a first focussing system for forming an optical image of an object to be inspected,
    ii: means for forming a 2-dimensional reproduction of the said optical image;
    iii: means for illuminating the said 2-dimensional reproduction with coherent light, the said 2-dimensional reproduction constituting a spatial light modulator to produce a diffraction pattern from the content of the optical image.

4. An optical inspection system as set forth in claim 3 wherein the said spatial light modulator comprises a liquid crystal device.

5. An optical inspection system as set forth in claim 1, wherein the said reference pattern comprises a set of electrical signals stored in a form which can be addressed for subsequent comparison and which have been obtained by presenting a specimen object to the system previously.

6. An optical inspection system as set forth in claim 5 further comprising means for introducing effective relative rotation between the reference pattern of signals and the electrical signals obtained from the light level detection means.

7. An optical inspection system as set forth in claim 6 in which the light level detection means comprises a photosensitive detector having different regions or elements which can be addressed separately to allow a scanning to be performed over the area on which the diffraction pattern is formed, and relative rotation is effected by altering the control signals employed to effect the said scanning.

8. An optical inspection system as set forth in claim 1 wherein the diffraction pattern comprises a Fourier transform of said object content.

9. An optical inspection system as claimed in claim 1 further comprising computing means programmed to perform multivariate analysis of signal patterns supplied thereto, and wherein means is provided for supplying the said electrical signals to the input of the computing means in a learning mode, whereby a discriminant function can be obtained for a set of objects (forming a training set) by presenting each object in the training set in turn to the inspection system in the learning mode.

10. An optical inspection system as set forth in claim 9 wherein further means is provided responsive to the said discriminant function to identify selected points within the area of the said detection means, so as to effect a reduction in the number of points within the said area which must be inspected during subsequent scans to enable the classification of diffraction patterns to be made during the said subsequent scans, thereby to speed up the said classification proceedure.

11. An optical inspection system as set forth in claim 9 wherein the said computing means is programmed so as to perform a least mean square analysis of the electrical signals derived from each of the diffraction patterns from a training set of objects.

12. An optical inspection system as set forth in claim 9 further comprising a memory associated with the said computing means, in which reference information obtained using the discriminant function for different objects in the training set is stored in the form of a look-up table, so that subsequently computed values for the discriminant function (using different subsequent objects) can be compared with the reference information stored in the memory, and each subsequent object identified according to the identity stored in the look-up table.

13. A method of identifying the object content of a field of view comprising the steps of:
   i. producing a diffraction pattern of the said object;
   ii. imaging the diffraction pattern onto a detector adapted to generate a first electrical signal one parameter of which varies independence on the light level at different points in the diffraction pattern image, and
   iii. comparing the said first electrical signal with one or more stored signals, the output of the comparison determining the identity of the said object content.

14. A method as set forth in claim 13 wherein a second electrical signal is derived from the said first electrical signal and identity comparison is effected between the said second electrical signal and the said stored signal or signals.

15. A method as set forth in claim 13 comprising means for selecting some of the regions of the detector on which the image of the diffraction pattern is focussed, and generating the said first electrical signal from the light level in the diffraction pattern at the selected regions.

16. A method of selecting regions of a detector in an optical inspection system in which a diffraction pattern of object content to be inspected is focussed on to the detector and in which an electrical signal is generated having a parameter which varies in dependence on the light level at selected points in the said diffraction pattern, comprising the steps of:
   i. presenting to the inspection system one of a plurality of objects from a group;
   ii. producing a diffraction pattern of the object content in the field of view as each object is presented to the system;
   iii. imaging the diffraction pattern onto a detector having a plurality of different light sensitive regions and generating from a scanning of the said regions a first electrical signal for each different diffraction pattern;
   iv. supplying the said first electrical signals to computing means programmed to produce from such electrical signals a discriminant function, the discriminant function determining the positions within the image area of the said detector, of selected ones of a plurality of regions therein, from which the said first signal is to be generated during subsequent inspection scans, and
   v. limiting the electrical signals from the said detector means during inspection scans to electrical signals arising from the said selected regions in the detector to thereby reduce the amount of information which must be processed during the inspection scans to permit identification of the objects of the said group when presented to the inspection system.

17. A method as set forth in claim 16 wherein the said limitation is effected by replacing the detector with one which is only sensitive at the positions of the said selected regions thereof.

18. A method as set forth in claim 16 wherein the said limitation is effected by masking the said detector with a mask having windows therein which correspond in position to the selected regions.

19. A method as set forth in claim 16 wherein electrical control signals are generated to effect a scanning of the regions of the detector, and the limitation is effected by adjusting the control signals so as to cause only the selected regions within the detector to be addressed.

20. In an optical inspection system comprising optical means for forming a diffraction pattern of the object content of the field of view of the system, light level detection means on which the diffraction pattern is focussed for producing electrical signals corresponding to light intensity at different points within the diffraction pattern, electrical circuit means responsive to the said electrical signals for comparing selected signals with a reference pattern, the outcome of each such comparison determining the identity of the object content of the field of view, an improved method of operation for reducing the time to identify objects of a given class, comprising the steps of:
   i. presenting to the system examples from the said group of objects so that each said object occupies the said field of view in turn,
   ii. forming a diffraction pattern of the object content of each said field of view and at least temporarily storing the first electrical signal obtained from the detector for each said field of view,
   iii. computing from the stored signals a discriminant function for the group and determining therefrom the positions of selected windows in the diffraction pattern image from which information must be derived to permit identification of the different objects within the group,
   iv. storing the discriminant function or signals which will allow for identification or creation of said selected windows, and
   v. utilising the stored function or signals to limit the information presented to the said electrical circuit means during subsequent inspections, to the electrical signals derived from the said selected windows in the diffraction pattern.

* * * * *